US012086937B2

(12) United States Patent
Gao et al.

(10) Patent No.: US 12,086,937 B2
(45) Date of Patent: Sep. 10, 2024

(54) VIRTUAL REALITY-BASED DERAILMENT ACCIDENT PASSENGER COMFORT DEGREE MONITORING SYSTEM AND METHOD

(71) Applicant: Beijing Jiaotong University, Beijing (CN)

(72) Inventors: Liang Gao, Beijing (CN); Fengzhuang Tong, Beijing (CN); Jianhua Zhu, Beijing (CN); Hui Yin, Beijing (CN); Xiaopei Cai, Beijing (CN); Tao Xin, Beijing (CN); Hong Xiao, Beijing (CN); Yanglong Zhong, Beijing (CN); Shuaijie Miao, Beijing (CN)

(73) Assignee: Beijing Jiaotong University, Beijing (CN)

( * ) Notice: Subject to any disclaimer, the term of this patent is extended or adjusted under 35 U.S.C. 154(b) by 185 days.

(21) Appl. No.: 17/983,885

(22) Filed: Nov. 9, 2022

(65) Prior Publication Data

US 2023/0154109 A1     May 18, 2023

(30) Foreign Application Priority Data

Nov. 15, 2021  (CN) .......................... 202111345975.4

(51) Int. Cl.
*G06T 17/20*  (2006.01)
*A63F 13/28*  (2014.01)
(Continued)

(52) U.S. Cl.
CPC .............. *G06T 17/20* (2013.01); *A63F 13/28* (2014.09); *B61L 99/00* (2013.01); *G02B 27/017* (2013.01);
(Continued)

(58) Field of Classification Search
CPC ........ G06F 3/011; G06F 3/012; G06F 3/0345; G06F 3/016; G06F 13/212; A61B 5/7455;
(Continued)

(56) References Cited

U.S. PATENT DOCUMENTS

| 2015/0325027 | A1* | 11/2015 | Herman ................ A63F 13/428 |
| | | | 345/633 |
| 2017/0025031 | A1* | 1/2017 | Dreyer ..................... G09B 9/12 |
| 2018/0369702 | A1* | 12/2018 | Hake ...................... A63G 25/00 |

FOREIGN PATENT DOCUMENTS

| CN | 102819770 A | 12/2012 |
| CN | 103307700 A | 9/2013 |
| CN | 205300628 U | 6/2016 |

OTHER PUBLICATIONS

Berndt, et al., "Human-centered design of a virtual reality training simulation for mass Casualty Incidents", 2018 10th International Conference on Virtual Worlds and Games Serious Applications, VS-Games 2018—Proceedings, Sep. 5-7, 2018, pp. 1-8 https://doi.org/10.1109/VS-Games.2018.8493427 (Year: 2018).*

* cited by examiner

*Primary Examiner* — Jin Cheng Wang
(74) *Attorney, Agent, or Firm* — Nitin Kaushik

(57) ABSTRACT

The present application provides a virtual reality-based derailment accident passenger comfort degree monitoring system and method, wherein the system comprises a train dynamics calculation module, a train operation state virtual simulation module, a six-degree-of-freedom motion platform, a train seat, a head-mounted display, a human body monitoring sensor system and a monitoring data storage terminal. The system establishes a database of the injury degrees of passengers with different ages under the train derailment; the test cost is low, the safety coefficient is high, and the repeatability of the test conditions is good, wherein
(Continued)

the comfort degree test data of the passengers under the same derailment inducement can be repeatedly obtained; the safety risk in the actual test is eliminated, so that the authenticity of the test result is ensured, and the test cost is low and the repeatability is high.

8 Claims, 3 Drawing Sheets

(51) Int. Cl.
  *B61L 99/00* (2006.01)
  *G02B 27/01* (2006.01)
  *G06F 3/01* (2006.01)
  *G06F 3/0346* (2013.01)
  *G06T 19/00* (2011.01)
(52) U.S. Cl.
  CPC .............. *G06F 3/011* (2013.01); *G06F 3/012* (2013.01); *G06F 3/0346* (2013.01); *G06T 19/006* (2013.01)
(58) Field of Classification Search
  CPC ..... A61B 5/7445; A61B 5/742; A61B 5/1118; B60W 40/08; G02B 27/017; A61M 2205/507; A61M 2205/70; A61M 2021/005; A61M 2021/0022; A63F 13/28; G06T 19/006
  See application file for complete search history.

VIRTUAL REALITY-BASED DERAILMENT ACCIDENT PASSENGER COMFORT DEGREE MONITORING SYSTEM AND METHOD

CROSS-REFERENCE TO RELATED APPLICATIONS

The application claims priority to Chinese patent application No. 202111345975.4, filed on Nov. 15, 2021, the entire contents of which are incorporated herein by reference.

TECHNICAL FIELD

The present application relates to the technical field of virtual simulation, and in particular to a virtual reality-based derailment accident passenger comfort degree monitoring system and method.

BACKGROUND

Train derailment is the biggest security threat in railway transportation, and especially the derailment of passenger trains has a bigger influence on passengers. Although a great deal of research has been carried out on the measures for preventing and controlling train derailment in recent years, the accident of train derailment is still occasionally reported at home and abroad due to the contingency of train derailment.

Once a train is derailed, especially a passenger train, the most serious problems are passenger rescue and psychological recovery of injured people. Since the injuries of passengers caused by different train derailment accidents are very different, a database of the injury degrees of the passengers with different age groups under different train derailment conditions needs to be built urgently, thereby providing reliable data reference for rescue after disasters and health recovery of the injured people. But the train derailment test is faced with risks, high costs and poor controllability. In addition, it is rare to have a method provided for virtually simulating the whole derailment process and testing the comfort degrees of passengers in a derailment accident.

With the rapid development of VR technology, catastrophic scene reappearance and virtual vision can be realized, but no scholar has built a virtual reality-based derailment accident passenger comfort degree monitoring system by combining the VR visual technology with a vehicle-track coupling dynamics theory.

SUMMARY

An embodiment of the present application provides a virtual reality-based derailment accident passenger comfort degree monitoring system and method which are configured for solving the problems in the prior art.

In order to achieve the above objective, the present application adopts the following technical solution.

According to the technical solution provided in the above embodiment of the present application, the present application provides a virtual reality-based derailment accident passenger comfort degree monitoring system and method, wherein the system comprises a train dynamics calculation module, a train operation state virtual simulation module, a six-degree-of-freedom motion platform, a train seat, a head-mounted display, a human body monitoring sensor system and a monitoring data storage terminal. The system utilizes the virtual reality technology to provide a real derailment scene for a testee sitting on the train seat, and tests and stores comfort degree parameters of all parts of the testee in a derailment accident for subsequent analysis. The system establishes a database of the injury degrees of passengers with different ages under the train derailment condition; the test cost is low, the safety coefficient is high, and the repeatability of the test conditions is good, wherein the comfort degree test data of the passengers under the same derailment inducement can be repeatedly obtained; the safety risk in the actual test is eliminated, so that the authenticity of the test result is ensured, and the test cost is low and the repeatability is high.

Additional aspects and advantages of the present application will be set forth in part in the following description, which will be obvious from the following description, or may be learned by practice of the present application.

BRIEF DESCRIPTION OF THE DRAWINGS

In order to more clearly explain the technical solutions in the embodiments of the present application, the following will briefly introduce the drawings needed in the description of the embodiments. Obviously, the drawings in the following description are only some embodiments of the present application. For those of ordinary skill in the art, other drawings can be obtained according to these drawings without any creative effort.

In the Figures.

Figure 1:
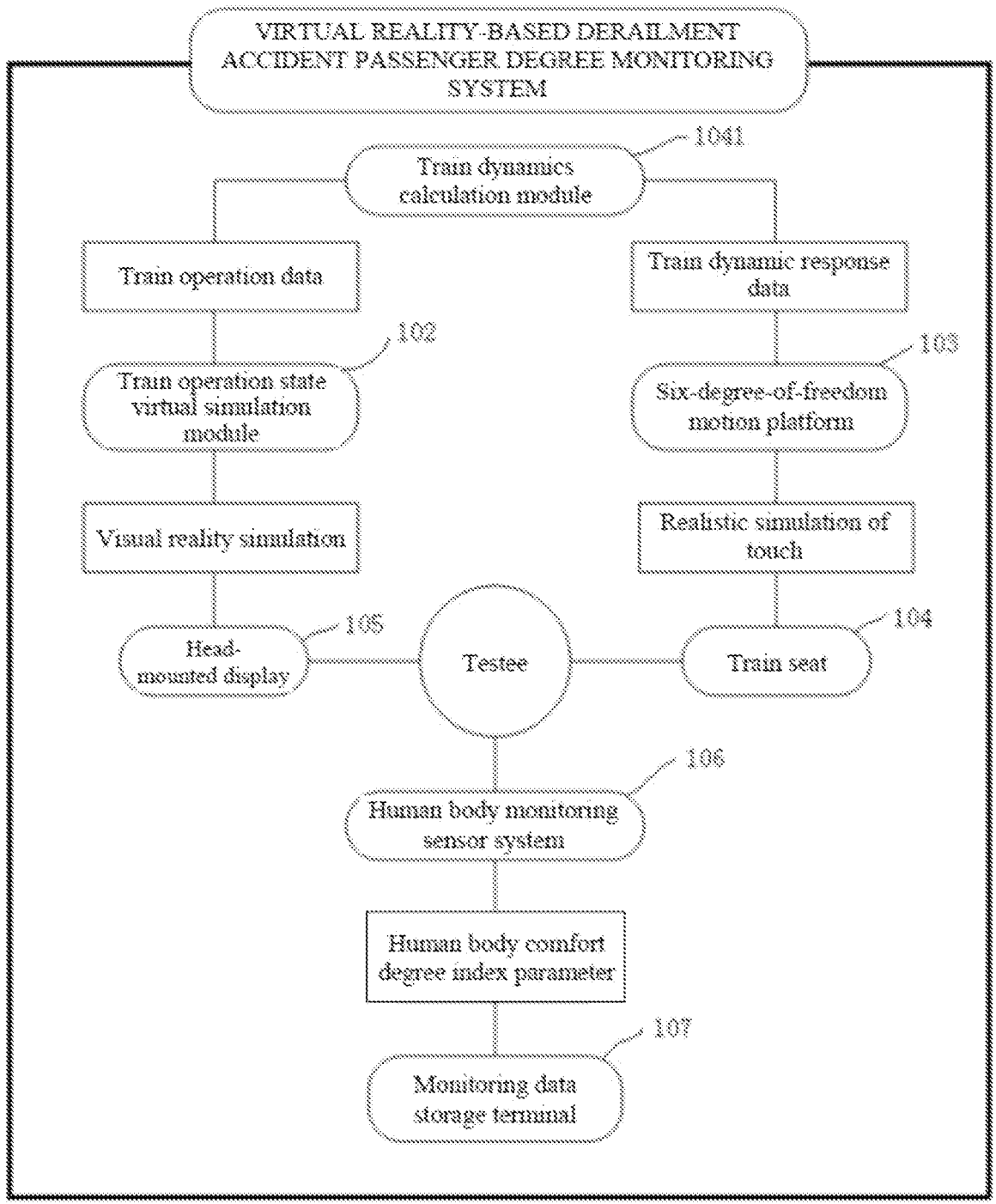
FIG. 1 is a logic block diagram of a virtual reality-based derailment accident passenger comfort degree monitoring system according to the present application.

101 is a train dynamics calculation module, 102 is a state virtual simulation module, 103 is a six-degree-of-freedom motion platform, 104 is a train seat, 105 is a head-mounted display, 106 is a human body monitoring sensor system, and 107 is a monitoring data storage terminal;

1031 is a first platform, 1032 is a second platform. 1033 is a first articulating base, 1034 is a second articulating base, and 1035 is an electric cylinder;

1061 is a human body acceleration sensor, 1062 is a pulse sensor, and 1063 is a temperature probe.

DETAILED DESCRIPTION

Reference will now be made in detail to the embodiments of the present application, examples of which are illustrated in the accompanying drawings, wherein like reference numerals refer to the same or similar elements or elements having the same or similar functions throughout.

The embodiments described below with reference to the accompanying drawings are exemplary only for explaining the present application and are not construed as limiting the present application.

As used herein, the singular forms "a", "an" and "the" are intended to include the plural forms as well, unless the context clearly indicates otherwise. It should be further understood that the terms used herein "comprises" and "comprising" refer to the presence of stated features, integers, steps, operations, elements, and/or components, but do not preclude the presence or addition of one or more other features, integers, steps, operations, elements, components, and/or a combination thereof. It should be understood that when an element is referred to as being "connected" or "coupled" to another element, it can be directly connected or coupled to the other element, or intervening elements may also be present. Furthermore, the term used herein "connected" or "coupled" may include wireless connection or coupling. As used herein, the term "and/or" includes any unit and all combinations of one or more of the associated listed items.

It can be understood by those skilled in the art that, unless otherwise defined, all terms (including technical and scientific terms) used herein have the same meaning as commonly understood by one of ordinary skill in the art to which the present application belongs. It should be further understood that terms, such as those defined in commonly used dictionaries, should be interpreted as having a meaning that is consistent with their meaning in the context of the prior art and will not be interpreted in an idealized or overly formal sense unless expressly so defined herein.

For the convenience of understanding of the embodiments of the present application, the following detailed description will be given by way of example with reference to the accompanying drawings, and the embodiments are not limited to the embodiments of the present application.

Referring to FIG. 1, the virtual reality-based derailment accident passenger comfort degree monitoring system and method are provided in the present application, wherein the system comprises a train dynamics calculation module 101, a train operation state virtual simulation module 102, a six-degree-of-freedom motion platform 103, a train seat 104, a head-mounted display 105, a human body monitoring sensor system 106 and a monitoring data storage terminal 107; wherein the train dynamics calculation module 101 is configured for generating dynamic response data of a train under a preset derailment condition and transmitting the dynamic response data to the train operation state virtual simulation module 102; the train operation state virtual simulation module 102 is configured for converting the dynamic response data into a control signal and transmitting the control signal to the six-degree-of-freedom motion platform 103 and generating a virtual scene of a derailment accident based on the dynamic response data; the six-degree-of-freedom motion platform 103 is connected with the train seat 104, and the six-degree-of-freedom motion platform 103 outputs a simulation vibration to the train seat 104 based on the control signal; the train seat 104 is configured for conducting the simulation vibration to a testee; and the head-mounted display 105 is configured for outputting the virtual scene of the derailment accident to the testee, providing the testee with the visual field in the vehicle after the derailment accident, and deepening the authenticity of the derailment scene; the human body monitoring sensor system 106 is mounted on the testee and configured for acquiring health index information of the testee in a simulation vibration process and transmitting the health index information to the monitoring data storage terminal 107; the monitoring data storage terminal 107 is configured for storing human body comfort degree data under each test working condition.

Furthermore, in a preferred embodiment according to the present application, the train dynamics calculation module 101 obtains the dynamic response data of the train under the preset derailment condition based on multi-body dynamics and a finite element analysis method and a train-track-lower foundation coupling dynamics analysis method;

the train operation state data comprise: (under a preset derailment condition) motion attitude data of a train body, a frame and a wheel set; and vibration acceleration data of the train.

The train operation state virtual simulation module 102 generates the virtual scene of the derailment accident identical to the working condition of the train dynamics calculation module 101 based on preset environment data and weather data in combination with the dynamic response data, and transmits the generated virtual scene of the derailment accident to the head-mounted display 105;

the preset environment data comprise: trains, tracks, roadbeds, bridges, tunnels, ambient and weather conditions.

Figure 2:
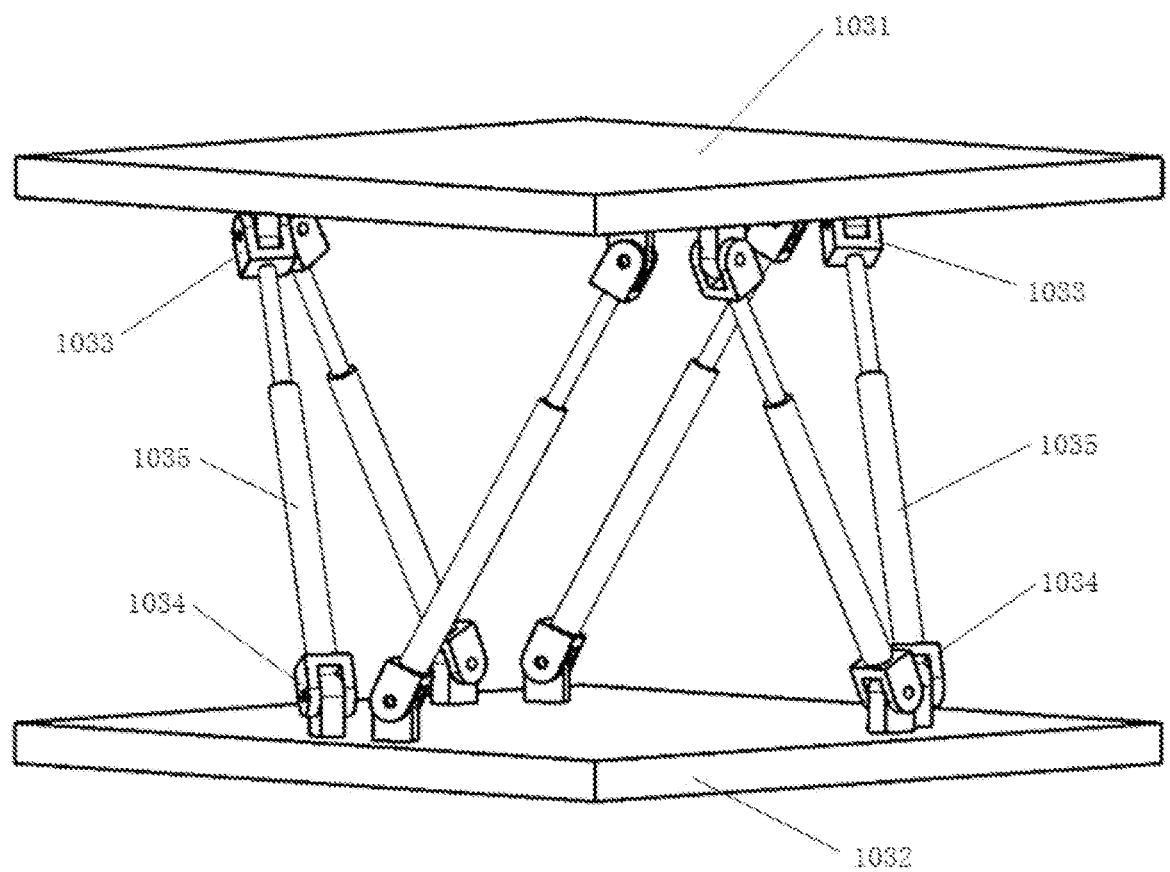
FIG. 2 is a schematic structural diagram of a six-degree-of-freedom motion platform of the virtual reality-based derailment accident human body comfort degree monitoring system according to the present application.

In a preferred embodiment according to the present application, as shown in FIG. 2, the six-degree-of-freedom motion platform 103 comprises a first platform 1031 and a second platform 1032 vertically spaced apart, the first platform 1031 being located above the second platform, and the second platform 1032 being located below the first platform, and the second platform 1032 is stably mounted on the ground by foundation bolts. A lower surface of the first platform 1031 has six first articulating bases 1033, and an upper surface of the second platform 1032 has six second articulating bases 1034; the space is internally provided with six electric cylinders 105, a cylinder barrel of each electric cylinder 105 is correspondingly connected with one first articulating base 1033, and a push rod of each electric cylinder 105 is correspondingly connected with one second articulating base 1034, so as to realize the hinge joint of each electric cylinder 105 and the upper and lower platforms. The motor of each electric cylinder 105 is in circuit connection with the train operation state virtual simulation module 102. According to the above arrangement, the six-degree-of-freedom motion platform 103 can realize spatial longitudinal, transverse and vertical translation and six-degree-of-freedom motion of nodding, shaking and rolling, and acceleration data obtained by the train dynamics calculation module 101 are input into the six-degree-of-freedom motion platform 103 to realize real simulation of vibration and displacement conditions in derailment accidents. The motor in each electric cylinder 105 adopts a linear motor, and the push rod is a piston rod. The push rod may also be a screw rod, and the motor can adopt a stepping motor at the moment.

The train seat 104 is mounted on the first platform 1031. In the present embodiment, the train seat 104 receives the vibration from the six-degree-of-freedom motion platform 103, as in an actual high-speed train seat 104.

In a preferred embodiment according to the present application, the human body monitoring sensor system 106 comprises:

a human body acceleration monitoring module, configured for acquiring human body vibration data;

a human body blood pressure and heart rate monitoring module, configured for acquiring human body blood pressure data and heart rate data; and a human body temperature monitoring module, configured for acquiring human body temperature change data.

Furthermore, the human body acceleration monitoring module has a plurality of acceleration sensors 1061 and a data acquisition instrument, wherein the plurality of acceleration sensors are respectively arranged on a head, shoulders, an abdomen, upper limbs and lower limbs of the testee and respectively acquire acceleration data of respective areas; the data acquisition instrument is in communication connection with the plurality of acceleration sensors and is configured for receiving the acceleration data;

the human body blood pressure and heart rate monitoring module comprises a pulse sensor 1062 arranged in a radial artery area of the testee and is configured for acquiring a human body pulse signal;

the human body temperature monitoring module comprises a plurality of temperature probes 1063, wherein the plurality of temperature probes are respectively arranged on a forehead, a trunk and hands of the testee and configured for acquiring body temperature change data of respective areas.

Figure 3:
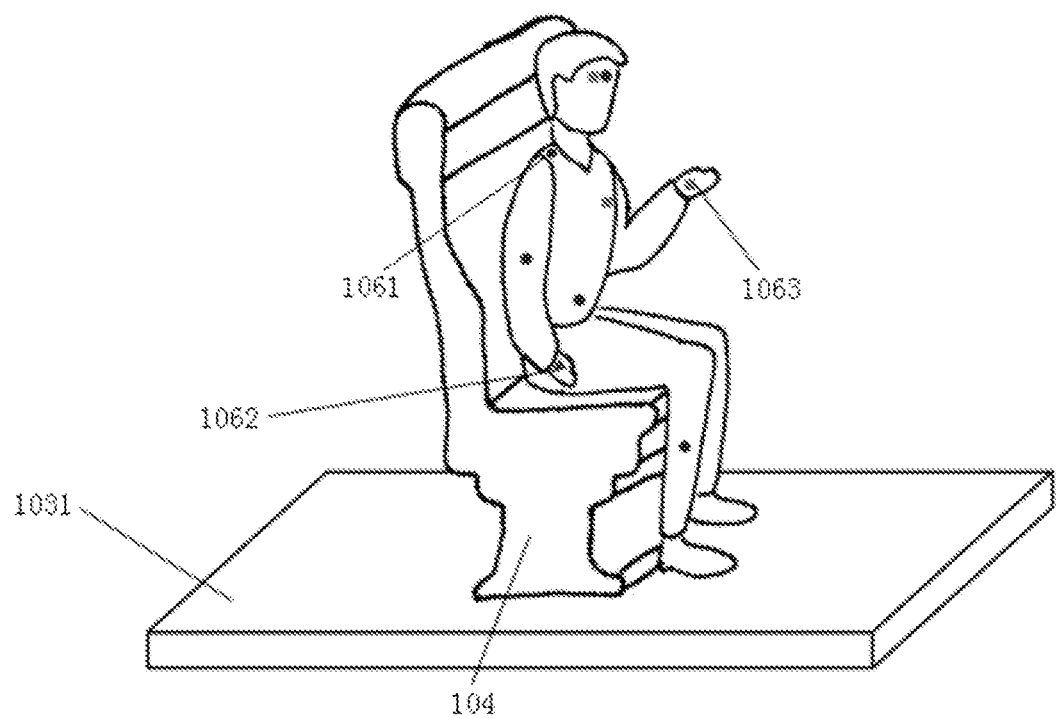
FIG. 3 is a schematic diagram of mounting positions of human body acceleration sensors, a pulse sensor and temperature probes of the virtual reality-based derailment accident human body comfort degree monitoring system according to the present application.

FIG. 3 is an example of mounting positions of human body acceleration sensors, a pulse sensor and temperature probes in the system. As shown in the figure, the train seat 104 is tightly and reliably mounted on the six-degree-of-freedom motion platform 103 through bolts, and the testee sits on the train seat 104 and receives the vibration from the six-degree-of-freedom motion platform 103. The triangular mark represents the pulse sensor 1062 which is mounted at the radial artery position of an arm to measure a pulse signal of the testee and obtains heart rate data of the testee through processing calculation. The square marks represent the temperature probes 1063 which are mounted on the forehead, the trunk and the hands to measure the body temperature data of different parts of the testee during the test so as to accurately represent the body temperature change of the testee. The circular marks represent the human body acceleration sensors 1061 which are mounted on the head, the shoulders, the abdomen, the upper limbs and the lower limbs according to the existing specifications. The acceleration sensors cannot be directly adhered and fixed onto the human body, but the acceleration sensors are firstly fixed onto elastic bands with good elasticity, and then the elastic bands are tied on the corresponding positions of the human body so as to realize accurate measurement of vibration of each part of the human body.

In a second aspect, the present application provides a virtual reality-based derailment accident passenger comfort degree monitoring method, comprising the following processes:

S1, establishing a vehicle-track-lower foundation coupling dynamics model through multi-body dynamics software and finite element software, and analyzing and obtaining dynamic response data of a train under a preset derailment condition based on the vehicle-track-lower foundation coupling dynamics model;

S2, establishing a derailment accident virtual scene model based on preset environment data and weather data in combination with the dynamic response data, and rendering and enhancing the derailment accident virtual scene model;

S3, inputting the derailment accident virtual scene model into a head-mounted display 105 to display output;

S4, converting the dynamic response data into a control signal and transmitting the control signal to a six-degree-of-freedom motion platform 103, such that the six-degree-of-freedom motion platform 103 outputs a vibration corresponding to the derailment accident virtual scene model to a train seat 104;

S5, arranging a human body acceleration monitoring module, a human body blood pressure and heart rate monitoring module and a human body temperature monitoring module on a testee, and acquiring human body vibration data, human body blood pressure data, heart rate data and human body temperature change data when the train seat 104 vibrates;

S6, transmitting the human body vibration data, the human body blood pressure data, the heart rate data and the human body temperature change data to a monitoring data storage terminal 107 for storage; and S7, obtaining human body comfort degree index parameters based on the transmission of the human body vibration data, the human body blood pressure data, the heart rate data and the human body temperature change data to monitoring data and transmitting the human body comfort degree index parameters to the monitoring data storage terminal 107 for storage.

The present application further provides a preferred embodiment, which shows a specific implementation process of the virtual reality-based derailment accident passenger comfort degree monitoring method.

In step one, derailment data of a train are generated.

The combined simulation is performed by adopting multi-body dynamics software simplack and finite element software abaque, finite element models of track structures such as steel rails, track plates and base plates and finite element models of lower foundations such as roadbeds and bridges are established in abaqus and the finite element models are imported into simplack through a modal superposition method, so as to establish a vehicle-track-lower foundation coupling dynamics model, and the dynamics characteristics of the train and the track structures are analyzed under the operating conditions of different running speeds, different vehicle models, different track types, different line types, different lower foundations and the like. In addition, a train vibration acceleration and dynamic motion data are acquired and generated under preset derailment conditions such as curve overspeed and foreign matter invasion.

In step two, modeling is performed in a virtual derailment scene.

According to the working conditions calculated in the step one, models of a train, a track, a lower foundation, a surrounding environment and the like are established by using Creo three-dimensional modeling software. The three-dimensional models are imported into a 3D MAX for model rendering, and an animation that the train breaks away from the interior of the rail compartment and shakes is made. A derailment scene is constructed by using the built three-dimensional model and the derailment animation based on train operation state data generated in the step one by using a unity engine, and the derailment scene is rendered to enhance the reality and the immersion.

In step three, the virtual scene is imported into a head-mounted display.

The derailment scene generated in the step two is imported into the head-mounted display, such that a testee can realize interaction and roaming through the head-mounted display.

In step four, an acceleration of a motion platform is input.

The train vibration acceleration data acquired in the step one are input into a six-degree-of-freedom motion platform, so as to provide a real vibration acceleration for the previous train seat and the testee and thus to enhance the vibration sense of the testee.

In step five, monitoring sensors are mounted.

The monitoring sensors are mounted for the testee sitting on the train seat and include acceleration sensors, blood pressure and heart rate sensors and body temperature sensors, all of which monitor the change conditions of the parameters of the human body under the derailment accident scene.

In step six, the human body comfort degree index parameters are stored.

The human body comfort degree index parameters monitored in the step five are stored into a monitoring data storage terminal for subsequent analysis and processing.

In conclusion, the present application provides a virtual reality-based derailment accident passenger comfort degree monitoring system and method, wherein the system comprises a train dynamics calculation module, a train operation state virtual simulation module, a six-degree-of-freedom motion platform, a train seat, a head-mounted display, a human body monitoring sensor system and a monitoring data storage terminal. The system utilizes the virtual reality technology to provide a real derailment scene for a testee sitting on the train seat, and tests and stores comfort degree parameters of all parts of the testee in a derailment accident for subsequent analysis. The system establishes a database of the injury degrees of passengers with different ages under the train derailment condition; the test cost is low, the safety coefficient is high, and the repeatability of the test conditions is good, wherein the comfort degree test data of the passengers under the same derailment inducement can be repeatedly obtained; the safety risk in the actual test is eliminated, so that the authenticity of the test result is ensured, and the test cost is low and the repeatability is high.

Those of ordinary skill in the art may understand that: the figures are schematic diagrams of one embodiment, and the modules or processes shown in the figures are not necessarily required to implement the present application.

From the above description of the embodiments, it is clear to those skilled in the art that the present application can be implemented by software plus necessary general hardware platform. Based on such understanding, the technical solutions of the present application may be embodied in the form of a software product which may be stored in a storage medium, such as a ROM/RAM, a magnetic disk, and an optical disk, and which comprises several instructions for causing a computer device (which may be a personal computer, a server, or a network device) to execute the method according to the embodiments or some parts of the embodiments of the present application.

All the embodiments in the specification are described in a progressive way, and the same and similar parts of each embodiment can be referred to each other, and the differences between each embodiment and other embodiments are highlighted. In particular, as apparatus or system embodiments are substantially similar to method embodiments, they are described in relative ease, and reference may be made to some descriptions of method embodiments for related points. The above-described apparatus and system embodiments are only schematic, wherein the units described as separate parts may or may not be physically separate, and parts displayed as units may or may not be physical units, may be located in one position, or may be distributed on multiple network units. Some or all of the modules can be selected according to the actual needs to achieve the purpose of this embodiment. One of ordinary skill in the art can understand and implement without inventive effort.

The above are only preferred embodiments of the present application, but the protection scope of the present application is not limited to this. Any changes or substitutions that can be easily thought of by those familiar with the technical field within the technical scope disclosed by the present application should fall within the protection scope of the present application. Therefore, the protection scope of the present application should be subject to the protection scope of the claims.

What is claimed is:

1. A virtual reality-based derailment accident passenger comfort degree monitoring system, comprising:
   train dynamics calculation module,
   a train operation state virtual simulation module,
   a six-degree-of-freedom motion platform,
   a train seat, a head-mounted display,
   a human body monitoring sensor system and a monitoring data storage terminal;
   wherein the train dynamics calculation module is configured for generating dynamic
   response data of a train under a preset derailment condition and transmitting the
   dynamic response data to the train operation state virtual simulation module;
   the train operation state virtual simulation module is configured for converting
   the dynamic response data into a control signal and transmitting the control signal to
   the six-degree-of-freedom motion platform and generating a virtual scene of a derailment accident based on the dynamic response data;
   the six-degree-of-freedom motion platform is connected with the train seat, and the six-degree-of-freedom motion platform outputs a simulation vibration to the train seat based on the control signal;
   the train seat is configured for conducting the simulation vibration to a testee;
   the head-mounted display is configured for outputting the virtual scene of the derailment accident to the testee;
   the human body monitoring sensor system is configured for acquiring health index information of the testee in a simulation vibration process and transmitting the health index information to the monitoring data storage terminal.

2. The system according to claim 1, wherein the train dynamics calculation module obtains the dynamic response data of the train under the preset derailment condition based on multi-body dynamics and a finite element analysis method and a train-track-lower foundation coupling dynamics analysis method;
   the dynamic response data of the train under the preset derailment condition comprise various train speeds, and train operation state data and vibration mechanics data under the conditions of train lower foundation and train derailment;
   the train operation state data comprise: motion attitude data of a train body, a frame and a wheel set; and vibration acceleration data of the train.

3. The system according to claim 1. wherein the train operation status virtual simulation module generates the virtual scene of the derailment accident based on preset environmental data and weather data in combination with the dynamic response data, and transmits the generated virtual scene of the derailment accident to the head-mounted display.

4. The system according to claim 1, wherein the six-degree-of-freedom motion platform comprises a first platform and a second platform vertically spaced apart, the first platform being located above the second platform, the train seat is mounted on the first platform, the second platform being located below the first platform, a lower surface of the first platform has six first articulating bases, and an upper surface of the second platform has six second articulating bases; the space is internally provided with six electric cylinders, a cylinder barrel of each electric cylinder is correspondingly connected with one first articulating base, and a push rod of each electric cylinder is correspondingly connected with one second articulating base; a motor of each electric cylinder is in circuit connection with the train operation state virtual simulation module.

5. The system according to claim 1, wherein the human body monitoring sensor system comprises:
   a human body acceleration monitoring module, configured for acquiring human body vibration data;
   a human body blood pressure and heart rate monitoring module, configured for acquiring human body blood pressure data and heart rate data; and
   a human body temperature monitoring module, configured for acquiring human body temperature change data.

6. The system according to claim 5, wherein the human body acceleration monitoring module has a plurality of acceleration sensors and a data acquisition instrument, wherein the plurality of acceleration sensors are respectively arranged on a head, shoulders, an abdomen, upper limbs and lower limbs of the testee and respectively acquire acceleration data of respective areas; the data acquisition instrument is in communication connection with the plurality of acceleration sensors and is configured for receiving the acceleration data;
   the human body blood pressure and heart rate monitoring module comprises a pulse sensor arranged in a radial artery area of the testee and is configured for acquiring a human body pulse signal;
   the human body temperature monitoring module comprises a plurality of temperature probes, wherein the plurality of temperature probes are respectively arranged on a forehead, a trunk and hands of the testee and configured for acquiring body temperature change data of respective areas.

7. A virtual reality-based derailment accident passenger comfort degree monitoring method, comprising:
   S1, establishing a vehicle-track-lower foundation coupling dynamics model through multi-body dynamics software and finite element software, and analyzing and obtaining dynamic response data of a train under a preset derailment condition based on the vehicle-track-lower foundation coupling dynamics model;
   S2, establishing a derailment accident virtual scene model based on preset environment data and weather data in combination with the dynamic response data, and rendering and enhancing the derailment accident virtual scene model;
   S3, inputting the derailment accident virtual scene model into a head-mounted display to display output;
   S4, converting the dynamic response data into a control signal and transmitting the control signal to a six-degree-of-freedom motion platform, such that the six-degree-of-freedom motion platform outputs a vibration corresponding to the derailment accident virtual scene model to a train seat;
   S5, arranging a human body acceleration monitoring module, a human body blood pressure and heart rate monitoring module and a human body temperature monitoring module on a testee, and acquiring human body vibration data, human body blood pressure data, heart rate data and human body temperature change data when the train seat vibrates;
   S6, transmitting the human body vibration data, the human body blood pressure data, the heart rate data and the human body temperature change data to a monitoring data storage terminal for storage; and
   S7, obtaining human body comfort degree index parameters based on the transmission of the human body vibration data, the human body blood pressure data, the heart rate data and the human body temperature change data to monitoring data and transmitting the human body comfort degree index parameters to the monitoring data storage terminal for storage.

8. The method according to claim 7, wherein step S1 comprises:
   S8, establishing a track structure finite element model and a lower foundation finite element model in the finite element software;
   S9, importing the track structure finite element model and the lower foundation finite element model into the multi-body dynamics software through a modal superposition method to establish the vehicle-track-lower foundation coupling dynamics model; and
   S10, obtaining dynamics characteristic data of the train and a track structure under various derailment conditions through analysis based on the vehicle-track-lower foundation coupling dynamics model.

* * * * *